Patented Feb. 5, 1929.

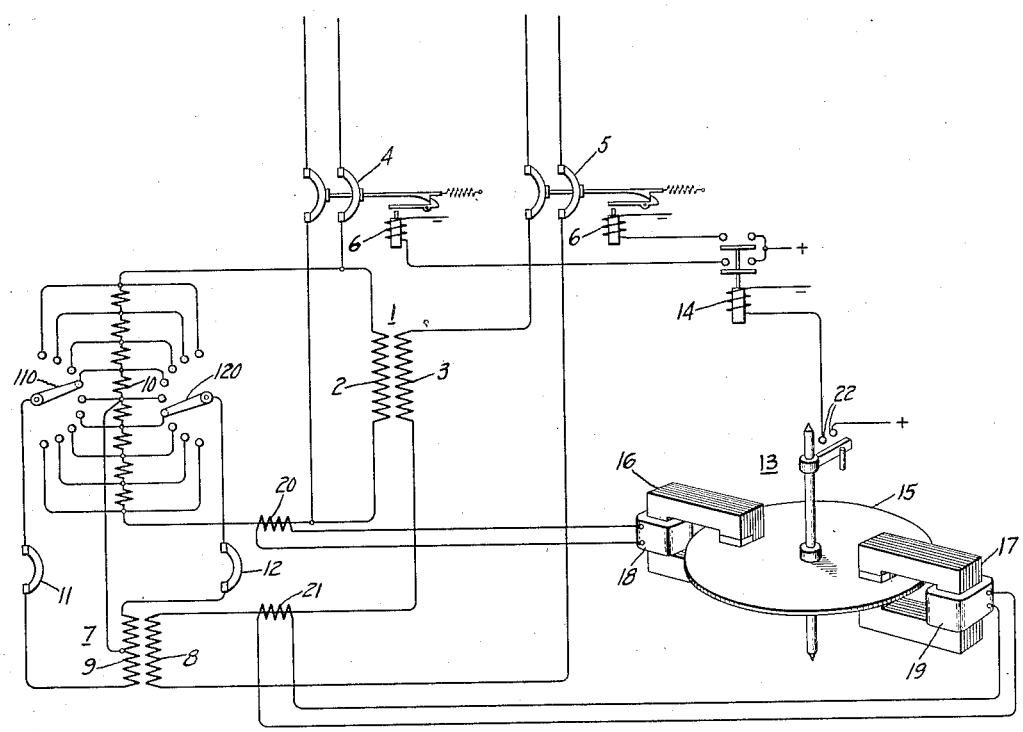

1,701,379

UNITED STATES PATENT OFFICE.

JOHN S. LENNOX, OF PITTSFIELD, MASSACHUSETTS, ASSIGNOR TO GENERAL ELECTRIC COMPANY, A CORPORATION OF NEW YORK.

PROTECTIVE ARRANGEMENT.

Application filed June 4, 1928. Serial No. 282,574.

My invention relates to improvements in protective arrangements for electric circuits and more particularly to the protection of voltage regulating means used to vary the voltage of electric circuits, transformers and the like without interrupting the load carried thereby. Such means, sometimes called a load ratio control unit, may be in the form of a voltage regulating transformer including a control or exciting winding connected in parallel with the circuit or one winding of a main or power transformer and another winding connected in series with the circuit or with the other winding of the main transformer. This voltage regulating transformer does not come within the scope of the protection usually provided for the circuit or the main transformer. Moreover, the currents in the voltage regulating transformer windings differ greatly even under normal conditions since the series connected winding carries all the current while the parallel connected winding carries but a fraction of the current. This difference is greatly accentuated in case of severe faults. If the fault is a through fault, that is, on some other part of the circuit than the voltage regulating transformer, this difference should not be effective to interfere with the much desired continuity of service on the sound portions of the circuit. One object of my invention is then to provide an improved protective arrangement whereby to insure maximum protection for a circuit voltage regulating unit under the widely varying current differences which may occur and yet avoid unnecessary circuit interruptions. Other objects of my invention will appear hereinafter.

My invention will be better understood from the following description when considered in connection with the accompanying drawing and its scope will be pointed out in the appended claims.

The single figure of the accompanying drawing illustrates diagrammatically an embodiment of my invention as applied to an electric system including a main transformer 1 having windings 2 and 3 whose circuits are arranged to be controlled by any suitable means such as circuit breakers 4 and 5, shown as of the latched closed type provided with trip coils 6. In order to change the voltage on one side of the main transformer without interrupting the load carried thereby, it may be provided with voltage regulating or adjusting means, shown as a voltage regulating transformer 7 of the type disclosed in United States Letters Patent 1,620,619 to P. M. Currier, dated March 8, 1927, and assigned to the same assignee as this invention. This transformer 7 includes a winding 8 connected in series with one of the windings such as 3 of the main transformer 1, the winding 9 inductively related to the winding 8 and a cooperating tapped control or exciting winding 10 which is arranged to be energized by a current synchronous with the current in the main transformer. For this purpose, the control winding 10 may be connected in parallel with the primary winding 2 of the main transformer 1 as shown. As is explained more fully in the patent heretofore mentioned, the voltage impressed on the series connected winding 8 may be changed at will to oppose or assist the voltage on the main transformer winding 3 by opening one of a pair of circuit breakers 11, 12 and then moving the corresponding tap switch 110, 120 to the proper position. The circuit breaker is then closed and the other circuit breaker opened and its corresponding tap switch moved to the proper position and then the second circuit breaker is closed.

Assuming the transformer winding 3 to be the secondary or load side of the transformer 1, it will be obvious that there may be a wide variation between the currents in the windings 8 and 10 of the voltage regulating transformer 7, since winding 8 carries the full load current and the winding 10 carries only a fraction of this current. It may in some cases carry only magnetizing current for the voltage regulating unit. Moreover, because of the magnetizing inrush current through the voltage regulating transformer 7 there may be a comparatively heavy current. Consequently, protection on a straight overcurrent or even on a mere difference current is very apt to result in unnecessarily disconnecting the main transformer from the line unless sensitivity of protection is sacrificed.

In accordance with my invention, I provide means for opening the circuit including the main transformer 1 and also the voltage regulating transformer 7 when the ratio of the current in the control winding 10 of the voltage regulating transformer to the current in its winding 8 exceeds a predetermined value. As shown, this means includes a relay 13 which is arranged to control the circuits of the trip coils 6 of the circuit breakers 4 and 5. For this purpose the relay 13 may be arranged to control the circuit of an auxiliary relay 14 which in turn controls the circuits of the trip coils 6. In this way the duty on the contacts of the relay 13 is reduced.

As shown, the relay 13 is of the induction disk differential type and includes a rotatable disk 15 of conducting material. The movement of this disk is arranged to be controlled by two motor elements 16 and 17 herein shown as of the shaded pole type and arranged to exert opposing torques on the disk 15. The motor elements 16 and 17 are respectively the operating and restraining elements and have their windings 18 and 19 connected in series relation with the voltage regulating transformer windings 10 and 8 through suitable means such as current transformers 20, 21 so as to be energized in accordance with the currents in the windings 10 and 8. The motor element 16 tends to turn the disk 15 in a direction to close the contacts 22 of the relay 13. The desired current ratio at which operation of the relay 13 is effected may be obtained by suitably proportioning the turns of the windings 18 and 19 with due regard to the turn ratios of the current transformers 20 and 21 so as to consider the currents which may be expected in the windings 10 and 8 of the voltage regulating transformer 7. In some cases the voltage regulating transformer may be constructed to provide what is called a 10% "buck" or "boost" so that the ratio of the currents in these windings may be as great as 10 to 1 under normal conditions. So long as there is no fault on the voltage regulating transformer 7 the restraining motor element 17 predominates over the operating motor element 16 to maintain the contacts 22 open. Obviously, if there is a through fault, for example on the load side of the transformer 1 beyond the circuit breaker 5 the restraining element 17 remains predominate and the transformer 1 is not cut out of service. On the other hand, if a fault occurs on one of the windings 8, 9, 10 of the voltage regulating transformer 7, the resulting current unbalance in the current transformers 20 and 21 is such that the motor element 17 is no longer able to predominate over the motor element 16 and the latter effects the closing of the contacts 22 and thereby the opening of the circuit breakers 4 and 5. In other words, if the fault does not involve the voltage regulating transformer 7, the relay 13 is ineffective to close its contacts 22 but when the fault occurs on the voltage regulating transformer the ratio between the currents in the windings 10 and 8 thereof is such as to bring about the predominance of the operating motor element 16 and the closing of the contacts 22.

While I have shown and described my invention in considerable detail, I do not desire to be limited to the exact arrangement shown but seek to cover in the appended claims all those modifications that fall within the true spirit and scope of my invention.

What I claim as new and desire to secure by Letters Patent of the United States is:—

1. In combination, a main transformer having two cooperating windings, a load ratio control unit including two cooperating windings connected respectively in parallel and in series with the windings of the main transformer, and means for protecting said unit on the occurrence of faults thereon including a differential relay having an operating winding connected to be energized in accordance with the current in the parallel connected winding of said unit and a restraining winding connected to be energized in accordance with the current in the series connected winding of the unit.

2. In combination, a main transformer having two cooperating windings, a voltage regulating transformer having a control winding connected to be energized by a current synchronous with the current in one of the windings of the main transformer and another winding in series relation with the other winding of the power transformer, and means for protecting said voltage regulating transformer including a relay having an operating winding connected to be energized in accordance with the current in said control winding and a restraining winding connected to be energized in accordance with the current in the other winding of the voltage regulating transformer.

3. In combination, an electric circuit, a voltage regulating transformer having two windings respectively connected in parallel and in series with said circuit, and means for protecting said voltage regulating transformer including a relay having two cooperating windings respectively connected to be energized in accordance with the currents in the windings of the voltage regulating transformer.

4. In combination, a main transformer having two cooperating windings, a voltage regulating transformer having a control winding connected in circuit with one winding of the main transformer and another winding connected in circuit with the other winding of the main transformer, and means for effecting the opening of the circuit of said transformers when the ration of the current in the control winding of the regulating transformer to the current in the other winding of the regulating transformer exceeds a predetermined value.

5. In combination, an electric circuit, a voltage regulating transformer having two windings respectively connected in parallel and in series with said circuit, and electro-responsive means for controlling said circuit when the ratio of the current in the parallel connected winding of the regulating transformer to the current in the series connected winding thereof exceeds a predetermined value including a differential relay having two opposing windings respectively connected in series relation with the windings of the regulating transformer.

6. In combination, a main transformer having two cooperating windings, a voltage regulating transformer having two cooperating windings respectively connected in circuit with the windings of the main transformer, and means for controlling the circuit of the transformers in accordance with the ratio between the currents in the two windings of the regulating transformer including a relay having two windings arranged to exert opposing effects respectively dependent on the currents in the two windings of the regulating transformer.

In witness whereof, I have hereunto set my hand this 31st day of May, 1928.

JOHN S. LENNOX.